United States Patent

[11] 3,624,016

[72] Inventor Baak W. Lew
 Wilmington, Del.
[21] Appl. No. 854,788
[22] Filed Sept. 2, 1969
[45] Patented Nov. 30, 1971
[73] Assignee Atlas Chemical Industries, Inc.
 Wilmington, Del.

[54] POLYURETHANES AS TEXTILE ASSISTANTS
 11 Claims, No Drawings
[52] U.S. Cl. ................................................. 260/29.2 TN,
 117/139.5 A, 260/67 TN, 260/77.5 B
[51] Int. Cl. .................................................... C08g 22/04
[50] Field of Search .......................................... 117/139.5
 A; 260/77.5 B, 67 TN, 67 R, 29.2 TN

[56] References Cited
 UNITED STATES PATENTS
2,850,407 9/1958 Zurawic et al. ............... 117/139.5

| 2,928,812 | 3/1960 | Ernst | 260/77.5 |
| 2,935,494 | 5/1960 | Whelan et al. | 260/77.5 |
| 3,072,613 | 1/1963 | Whelan et al. | 260/77.5 |
| 3,084,140 | 4/1963 | Gurgiolo et al. | 260/77.5 |
| 3,491,067 | 1/1970 | Sellet | 117/139.5 |

Primary Examiner—Donald E. Czaja
Assistant Examiner—Eugene C. Rzucidlo
Attorneys—Kenneth E. Mulford, Roger R. Horton and Ernest G. Almy ABSTRACT: Essentially water-soluble methylolated low molecular weight polyurethanes formed from polyol carbonates and amines are described, and a method for treating fabrics with these methylolated polyurethanes or with methylolated polyol urethanes to enhance the abrasion resistance, crease recovery, softness and other properties of the fabrics is disclosed.

3,624,016

POLYURETHANES AS TEXTILE ASSISTANTS

This invention relates to essentially water-soluble methylolated low molecular weight polyurethanes and to their use as textile treating assistants which enhance the properties of textile fabrics. More particularly this invention concerns methylolated low molecular weight polyurethanes and methylolated polyol urethanes formed from polyol carbonates which are permanent textile treatment assistants.

The reaction of an amine with a carbonate to form a urethane linkage is known in the art. In u.S. Pat. No. 2,935,494, reaction of erythritol dicarbonate with a polyfunctional amine to form linear and cross-linked polyurethanes is illustrated. In U.S. PAT. No. 3,072,613, the reaction of primary or secondary amines with cyclic carbonates is also shown. However, in the above art high molecular weight products are formed whereas the urethanes of the subject disclosure are low molecular weight structures wherein methylol radicals have been substituted for at least one quarter of the aminehydrogens of said low molecular weight polyurethanes.

It is an object of this invention to provide water-soluble methylolated low molecular weight polyurethanes.

It is also an object to provide polyurethanes having an alkyl group substituted thereon.

It is also an object of this invention to provide low molecular weight polyurethanes and polyolurethanes for use as permanent textile treatment agents.

It is also an object to provide textiles with improved fabric properties.

It is also an object of this invention to provide a process for treating fabrics with said textile assistants.

Further objects of this invention will become apparent to those skilled in the art from the following detailed description of the invention.

The water-soluble low molecular weight methylolated polyurethanes of this invention are the reaction product of formaldehyde with the reaction product of a polyol carbonate of a polyol containing at least four carbon atoms and at least four hydroxyl groups with said carbonate having an average of two through about five carbonate groups per molecule, and an amine containing at least two primary and/or secondary amine groups (a"polyaminoamine").

The methylolated polyurethanes of this invention can be made from a large variety of polyfunctional amines and polyol carbonates. The carbonate used in preparing said low molecular urethanes can be a:

specific polyol carbonate
mixture of various polyol carbonates
mixture of carbonates of a particular polyol with a varied number of carbonate groups
combination of the above.

Among the polyaminoamines which may be used in preparing said urethanes are alkyl amines, alkenyl amines, alkylene amines, aralkylamines, oxyalkyl amines, haloalkylamines, and polyoxyalkanediamines, polyoxapolyoxyalkanamines, and polyoxapolyazalkanediamines wherein the total oxalkane content is from about two to 20 oxyalkylene units per molecule.

Illustrative of these polyaminoamines are hexamethylenediamine, dipropyleneglycoldiamine, triethyleneglycoldiamine, tetrabutyleneglycoldiamine, pentamethylendiamine, dipropylenetriamine, tetraethyltriamine, triethylenetetramine, putrescine, 1,2 butane diamine, 4 chloro hexamethylenediamine, 4 hydroxy-1,8 diamino-octane, 1,2-butene diamine, 5 phenyl-1,2-diamino-pentane, bromophenyltriethyleneglycoldiamine, and $NH_2(C_3H_6-O)_3-C_3H_6-N-C_3H_6-O-C_3H_6NH_2$.

A configuration of the polyurethanes made from the above carbonates and polyaminoamine may be represented as:

$$-\overset{OH}{\underset{|}{C}}-C-O-\overset{O}{\underset{||}{C}}-N-R-N-\overset{O}{\underset{||}{C}}-O-C-\overset{OH}{\underset{|}{C}}$$

or $$-\overset{OH}{\underset{|}{C}}-C-O-\overset{O}{\underset{||}{C}}\phantom{XXX}\overset{O}{\underset{||}{C}}-O-\overset{COH}{\underset{|}{C}}-\\ \phantom{-C-}\underset{COH}{|}\phantom{XX}\underset{N-R-N}{}\phantom{XX}\underset{OH}{|}$$

with the free hydroxyl group adjacent to each urethane linkage being characteristic of a carbonate—amine formed polyurethane. Naturally, combinations of the two above configurations are formed during the carbonate-amine reaction. In the above formula R can be any divalent radical.

A preferred class of polyaminoamines include alkyl amines, alkylene amines, polyoxalkanediamines, polyoxapolyazalkanamines, and polyoxapolyazalkanediamines with from two to about 20 oxyalkylene groups per molecule and no oxyalkylene chain contains more than five oxylalkylene. Said polyaminoamines usually contain from about two to about four primary and/or secondary amine groups per molecule.

A preferred class of polyol carbonates used in preparing said methylolated polyurethanes can be based upon the following polyols:

hexitols, hexaneterols, hexanepentils, pentitols, pentanetetrols, tetritols, hexitans, diglycerol, and the nonreducing polyhydric alcohols of di- and tri-saccharides. The polyol carbonates of the above polyols have an average number of carbonate groups per molecule of from about two through five carbonate groups per molecule. Examples of the carbonates would include:

Sorbitol di- and tri-carbonate and mixtures of these with themselves and the mono carbonate.

Diglycerol dicarbonate and mixtures with its monocarbonate.

Erythritol dicarbonate and mixtures with its monocarbonate.

Sorbitan dicarbonate and mixtures with its monocarbonate.

Xylitol dicarbonate and mixtures with its monocarbonate.

Melibiitol di-, tri- and tetracarbonates, their admixtures and mixtures with the monocarbonate.

Raffinitol di-, tri-, tetra- and pentacarbonates, their admixture and their mixtures with the monocarbonate.

A class of said methylolated polyurethanes are the reaction product of formaldehyde and the reaction product of said carbonates, said polyamines and a quantity of a primary monoamine. Said primary aliphatic monoamine may be an alkenyl or alkyl monoamine of about 10 through about 25 carbon atoms or a polyoxalkanamine containing an oxyalkylene chain of from two through about six oxyalkylene units. Representative of these aliphatic monoamines are decylamine, isoctyldecylamine, docosylamine, pentadecylamine, dodecenylamine, docosenylamine, polyoxyethylene(2)amine, polyoxypropylene(3)amine polyoxybutylene(6)amine and polyoxyethylene(5)amine.

In a preferred class of methylolated polyurethanes, the aliphatic monoamines employed in their preparation are alkylamines of from 10 through 20 carbon atoms, the polyol carbonate is of a polyol selected from hexitol, hexane tetrol and pentol, pentitol and pentane tetrol, tetritol and hexitan and have an average number of cyclic carbonate groups of about two through about three.

The methylolated polyurethanes of this invention may be made by various process routes. A polyol carbonate, an aliphatic monoamine and polyaminoamine can be reacted in one step by mixing said ingredients and maintaining a temperature between about 0° to about 125° C. The aliphatic monoamine may be reacted first with the polyol carbonate and then this product further reacted with the polyaminoamine, both reactions also being carried out at the 0° to 125° C. temperature range. A road range of monoamine present in said reaction would be up to about 0.5 moles of monoamine per mole of carbonate. A more preferred range of aliphatic monoamine to carbonate is from 0 to about 0.35 moles per mol. Where no aliphatic monoamine is present, the polyol carbonate and polyaminoamine are also reacted within the above temperature range. In all cases the reaction will be terminated when the reduced viscosity of the reaction mixture is less than about 0.08.

Reduced viscosity as used above is the ratio of specific viscosity to concentration of the solution which is always calculated in grams of solute/100 c.c. of solvent. One can calculate same by the formula:

$$\text{Reduced Viscosity} = \frac{\text{Viscosity of Solution} - \text{Viscosity of Solvent}}{\text{Concentration of Solution}} \quad (1)$$

wherein the numerator is relative viscosity. The viscosity measurements may be made in any type of viscosity measuring instrument. The actual units of reduced viscosity are therefore c.c/gram, however, since this is standard nomenclature the units are not used when reference is made to reduced viscosity.

Besides controlling the molecular weight by periodically checking the reaction mixture's reduced viscosity, the reactants themselves may ensure the termination of the polyurethane at low molecular weights. When a monoamine is used the number of available carbonate groups is decreased and thus the chain proliferation will end sooner due to the lack of additional available, carbonate groups. Likewise, where the reaction mixture contains a quantity of monocarbonates these too will be terminating molecules of any proliferating urethane chain they react with. When both monocarbonates and monoamines are present their combined action will cause the molecular weight of the reaction to remain low and only minor control by checking of reduced viscosities is needed. It has been found that reduced viscosities within the desired range can usually be achieved when the reaction is maintained for about 3 to about 10 hours depending upon the reactants used. A preferred range of reduced viscosity is from about 0.06 to about 0.01.

The methylolated polyurethanes of this invention are made by reacting said low molecular weight polyurethanes with a molar excess of formaldehyde or other convenient source of formaldehyde, that is greater than one molecule of formaldehyde per available amine hydrogen atom of said low molecular weight polyurethanes. In general the moles of formaldehyde per replaceable amino hydrogen are from about 0.5 to about 1.5 and the reaction is carried out at temperatures from about 0° to about 80° C. In the preferred methylolated polyurethanes at least 25 percent of the amino hydrogens of said polyurethane have been replaced by methylol radicals.

In general, the reaction of an amine and carbonate forms a polyurethane. Thus, if 1:2, 5:6 hexitoldicarbonate, the formula of which is:

(2)

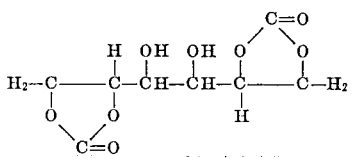

is reacted with putrescine, a segment of the resulting polyurethane may be represented by the formula:

(3)

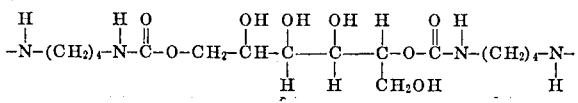

Illustrated above again are the two possible linkages resulting from reacting terminal polyol carbonate ring with an amine.

Typical examples of producing the methylolated polyurethanes of this invention are:

EXAMPLE 1

Thirty grams of sorbitol dicarbonate are reacted with 10.3 grams of n-octadecylamine, in 45 ml. of methyl alcohol, at 65°–67 C. for 3 hours. The reaction mixture is then cooled to 45° C. and 11.2 grams of diethylene triamine added. This mixture is then refluxed for another 3 hours at 67°–71° C. The resultant polyurethane is separated from the solvent by distillation.

Forty grams of this sorbitol diethylene triamine polyurethane n-octadecyl urethane is then methylolated at 75°–80° C. with 50 ml. of 37 percent formaldehyde solution in 20 ml. of water for 2 hours. The pH is adjusted to 4.5 by the addition of dilute hydrochloric acid, resulting in a creamy orange solution, and containing 23 percent of methylolated polyurethane.

EXAMPLE 2

One hundred grams of crude sorbitol dicarbonate, wherein 85 to 95 mol percent is the dicarbonate with the remainder mono- and tri-carbonates, divided in about a 1/1 mole ratio, is reacted with 40.5 grams of diethylene triamine in 50 ml. of methyl alcohol at 70° C. The methyl alcohol is slowly distilled off and after 4 hours a low molecular weight polyurethane is formed, which is a light yellow glassy resin. The reduced viscosity of this product is 0.055 measured at 0.2 weight percent in water.

Eighty six grams of this polyurethane is reacted with 78 ml. of 37 percent formaldehyde solution and 20 ml. of water at 90° C. for 2 hours to form the methylolated polyurethane. Enough dilute hydrochloric acid is added to the cooled solution to bring the pH to 5.5, and water is added to yield 261 grams of solution containing 38 percent of the methylolated polyurethane.

EXAMPLE 3

One hundred grams of a mixture of 1,2,5,6 hexanetetroldicarbonate and monocarbonate, 95 mol percent being the dicarbonate, are heated with 18 grams of n-dodecylamine in 50 ml. of alcohol at 64°–67° C. for 3 hours. The reaction mixture is cooled to 40° C. and 53 grams of triethyleneglycoldiamine is added. This mixture is then reacted for an additional 3 hours at its reflux temperature 67°–71° C. The resultant 1,2,5,6 hexanetetroltriethyleneglycoldiamine polyurethane n-dodecylurethane is separated from the solvent by distillation.

Sixty grams of this polyurethane is then methylolated at 75°–80 C. with 55 ml. of 37 percent formaldehyde in 25 ml. of water.

EXAMPLE 4

To a mixture of 100 grams of melibiitol mono-, di- and tri-carbonate, wherein 90–95 percent is the di-carbonate with the remaining 5–10 mole percent being divided between the mono- and tri-carbonate in about a 1/1 ratio, is reacted with 11.1 grams of pentadecylamine in 60 ml. of alcohol at 65°–68° C. for 3 hours. This reaction mixture is cool to 45° C. and 10 grams of tetramethylenediamine is added. This mixture is heated to the reflux temperature, 66°–71° C., and reacted for an additional 3.5 hours The polyurethane is then separated by distillation.

Forty grams of this polyurethane are then methylolated by heating at 75°–80° C. in the presence of 50 ml. of 37 percent formaldehyde and 20 ml. of water for 2 hours.

EXAMPLE 5

Forty grams of xylitoldicarbonate and 10 grams of dodecylamine in 60 ml. of methyl alcohol are reacted at 67°–69 C. for 3 hours. The mixture is cooled to 40° C. and then 15 grams of diethylenetriamine are added. This reaction mixture is then heated to reflux temperature, 67°–71° C. and reacted for 4 additional hours. The resultant xylitol diethylenetriamine polyurethane n-dodecylurethane is separated from the solvent by distillation. Thirty grams of polyurethane are then methylolated at 75°–80° C. with 50 ml. of 37 percent formaldehyde in 20 ml. of water for 2 hours.

EXAMPLE 6

Three grams of crude sorbitol dicarbonate, wherein approximately 75 mol percent is the dicarbonate with the remainder mostly the monocarbonate, is reacted with 1.3 grams of hexamethylene diamine, in 5 ml. of methanol, for 20 hours at room temperature. The methanol is removed by evaporation at 70° C. to yield 4.3 grams of a clear, yellow, glassy resin. The reduced viscosity of this polyurethane, measured at 0.2 percent concentration in water, is 0.035.

1.2 grams of this resin is reacted with 1 ml. of 37 percent formaldehyde solution for 10 hours at 95° C. Five ml. of water is added to form a clear yellow solution of the methylolated polyurethane.

The methylolated polyurethanes described above, and also methylolated polyol urethanes, which are the reaction product of formaldehyde with the reaction product of ammonium hydroxide and a polyol carbonate of a polyol containing four or more hydroxyl groups and four or more carbon atoms have been found to be excellent durable textile assistants.

Said methylolated polyol urethane contains an average of at least about 2 urethane groups per molecule.

These methylolated polyol urethanes are produced by reacting about 1 mole of ammonium hydroxide per carbonate group of a polyol carbonate at temperatures of about 0° C. to about 60° C. and then reacting this with formaldehyde. The methylolation occurs at 0°–60° C. An example of making a methylolated polyol urethane is: erythritol dicarbonate is reacted with ammonium hydroxide in a water solution for about 10 hours at 25° C. at a mole ratio of 2/1 respectively. This erythritol diurethane is then reacted with a formaldehyde, as a 37 weight percent water solution, in sufficient quantity to ensure substitution of at least 50 percent of the urethane hydrogen with methylol groups.

The preferred list of polyol carbonates enumerated above for making the methylolated polyurethanes may be used in preparing these polyol urethanes. Therefore, methylolated sorbitol triurethane, methylolated pentaerythritol diurethane, methylolated raffinitol pentaurethane and other similar methylolated polyol urethanes made from the preferred list of polyol carbonates are within the textile treatment assistants called methylolated polyol urethanes above.

The properties which the above assistants enhance, i.e., the crease resistance, abrasion resistance, the tear strength, and/or the softness of the fabric, will depend on the particular assistant used. If a methylolated polyurethane is made using a mole ratio of aliphatic monoamine to carbonate of either 0.35 or 0.05 the products will enhance different fabric properties. At the 0.05 mole level the fabric would exhibit greater crease resistance and have a higher crease angle recovery, at the 0.35 mole ratio the abrasion resistance of the fabric would be better. In the latter instance the crease resistance would not be as highly improved as in the former and vice versa. The methylolated polyol urethanes are permanent press assistants.

Textiles such as cotton poplin and print cloth, rayon-cotton, cotton-wool, polyester-cotton, acrylic-cotton, and polyamide-cotton blends, and blends of rayon with acrylic, polyamide and polyester fibers will all show improved properties when the textile assistants of this invention are used.

The usual treatment solution employing said textile assistants contain: the assistant, a catalyst for insuring proper setting of the adjunct on the fabric, a wetting agent, a solvent—usually water, and other treatment additives as desired.

The wetting agents most often used in these textile treatment solutions are polyoxyethylenealkyphenols and polyoxyethylenealkylphenoxyalcohols. Some specific agents in these are polyoxyethylene(9.0)dodecylphenol, polyoxyethylene(9.5) -isooctylphenol, polyoxyethylene(9.0)n onylphenol, polyoxyethylene-(53)nonylphenol, polyoxyethylene(12)dodecylphenol, polyoxyethylene(9–10)octylphenoxyethanol, polyoxyethylene(9.5)octylphenol, and polyoxyethylene(9)dodecylphenoxypropanol. These and other similar wetting agents which cause a uniform spreading of the adjunct over the treated fabric, are within the scope of this method of treatment with a preferred oxyalkylene chain of 8–20. The usual concentration of these agents is about 0.02 to about 0.30 weight percent of solution with a preferred concentration of 0.05 to 0.30. Higher levels are not useful, levels lower than 0.02 are ineffective.

Any catalyst which will ensure proper curing of the resin on the treated fabric will be usable in carrying out this invention. Some typical catalysts used in industry are: zinc chloride, ammonium chloride, ammonium dihydrogen phosphate, zinc nitrate hexahydrate and magnesium chloride hexahydrate. Such catalysts are used at from 4 to 18 weight percent based on active resin. Higher levels are excessive and lower levels less effective.

In treating fabrics by this method the clothe is padded, so that a 50 to 100 percent pickup is achieved. (Pickup is a term used in the art to denote that weight percent of solution based upon initial fabric weight that the fabric absorbs.) The preferred pickup is from 60 weight percent, to insure sufficient adjunct being present on the fiber, to a maximum of usually 100 percent due to a limit of fabric retention.

After padding the treated textile is dried by heating in a drier at temperatures between 160° and 225° F. Lower temperatures can be used but drying is slowed. Temperatures above 225° F. are not used since premature setting of the resin could occur causing a loss in the final fabric's properties. A more usual temperature range for drying is 190° to 220° F.

After drying the fabric is heated at temperatures between about 240° and about 360° F. in an oven, or by other heating means, and the resin, textile adjunct, is cured. However, temperatures above and below this range can be used successfully. To insure proper curing of the resins by the instant method a preferred temperature range of 265° to 340° F. is used.

To enable one skilled in the art to carry out this method the following nonlimiting examples are presented.

EXAMPLE 7

A swatch of cotton cloth is treated at 80 percent pickup with a textile treating solution containing 22 weight percent of the adjunct solution prepared in example 1, 0.25 weight percent of polyoxyethylene(9.5)nonylphenol, and 0.35 weight percent of zinc nitrate hexahydrate in water.

The swatch is then dried at 210° F. for 3 minutes and cured at 325° F. for 5 minutes. The cloth is thus permanently treated. The properties of this cloth are given in table I.

EXAMPLE 8

A swatch of cotton cloth is treated at 80 percent pickup with a textile treating solution containing 13 percent of the methylolated polyurethane solution of example 2, 0.25 percent of polyoxyethylene(9.5)-nonylphenol, 0.35 percent of zinc nitrate hexahydrate (all based on weight percent of solution) with the remainder being water.

The cloth is then dried at 210° F. for 3 minutes and cured at 325° C. for 5 minutes. The properties of this treated cloth are given in table I.

EXAMPLE 9

A swatch of cotton cloth is treated at 80 percent pickup with a textile treatment solution containing 5 weight percent of methylolated erythritol-diurethane, 0.25 weight percent of polyoxyethylene(9.5)nonylphenol, and 0.35 weight percent of zinc nitrate hexahydrate with the remainder water.

The cloth is then dried in an oven at 210° F. for 3 minutes and cured for 5 minutes at 325° F. The fabric has good crease resistance. Table I gives the properties of the treated cloth.

EXAMPLE 10

A swatch of rayon-cotton cloth is treated at 70 percent pickup with a textile treating solution containing 8 percent of the methylolated polyurethane prepared in example 3 above, 0.11 percent of polyoxyethylene(9.0)isooctylphenol, and 0.50 percent of magnesium chloride hexahydrate. The cloth is then dried for 6 minutes at 195° F. and cured for 10 minutes at 300° F.

EXAMPLE 11

A swatch of 50 percent cotton-polyester cloth is treated at 65 percent pickup with a textile treating solution containing, by solution weight, 18 percent of the methylolated polyurethane of example 5, 0.09 percent of polyoxyethylene(9.5)octylphenoxyethanol, 0.30 percent of ammonium dihydrogen phosphate.

Said cloth is then dried for 20 minutes at 165° F. and cured for 15 minutes at 260° F.

EXAMPLE 12

A swatch of 60 percent acetate-rayon cloth is treated at 75 percent pickup with a textile treatment solution containing, based on solution weight, 24 percent of the methylolated polyurethane of example 4, 0.30 percent polyoxyethylene(9.0)dodecylphenol, 0.25 percent of zinc nitrate hexahydrate in water.

The cloth was then dried for 3 minutes at 200° F. and cured for 4 minutes at 350° F.

TABLE I

| Textile resin of— | Monsanto crease angle recovery test W+F[1] (degrees) | Stall-flex abrasion resistance test W+F[1] | Elmendorf tear strength test (lb.) | | 1″ cut strip tensile strength (lb.) test | |
|---|---|---|---|---|---|---|
| | | | W[1] | F[1] J | W[1] | F[1] |
| Example 7: | | | | | | |
| 0 washes | 217 | 1,245 | 1.67 | 1.75 | 42.6 | 28.4 |
| 10 washes | 193 | 2,885 | 1.73 | 1.84 | 40.3 | 25.4 |
| Example 8: | | | | | | |
| 0 washes | 171 | 978 | 1.73 | 1.64 | 49.2 | 38.6 |
| 10 washes | 154 | 962 | 1.62 | 1.55 | 53.0 | 34.1 |
| Example 9: | | | | | | |
| 0 washes | 271 | 586 | 1.12 | 0.89 | 26.5 | 16.3 |
| 10 washes | 255 | 573 | 0.81 | 0.88 | 28.7 | 17.0 |

[1] W is the Warp direction, F the fill direction, W+F the sum of test averages over both directions in the fabric.

What I claim is:

1. A water-soluble methylolated polyurethane which is the reaction product of formaldehyde with a low molecular weight polyurethane having a reduced viscosity in water at 25° C. or at most about 0.08 and which is the reaction product of
    a polyol carbonate of a polyol containing at least four carbon atoms and at least four hydroxyl groups and selected from the group consisting of hexitols, hexanetetrols, hexanepentols, pentitols, pentanetetrols, tetritols, hexitans, and nonreducing polyhydric alcohols of di- and trisaccharides, said polyol carbonate having an average carbonate content of about two through about five carbonate groups per molecule, and
    an aliphatic polyamine containing at least two amine groups selected from the group consisting of primary amine groups and secondary amine groups, in sufficient quantity to obtain a ratio of from about 0.9 to about 1.1 amine groups per carbonate group.

2. A methylolated polyurethane of claim 1 wherein a primary aliphatic monoamine selected from the group consisting of alkyl monoamines containing from 10 to 25 carbon atoms, alkenyl monoamines containing from 10 to 25 carbon atoms, and polyoxaalkylamines containing from two through five oxyalkylene groups, is reacted with said polyol carbonate and said aliphatic polyamine in a mole ratio of up to about 0.5 moles of said primary aliphatic monoamine per mole of said polyol carbonate.

3. A methylolated polyurethane of claim 1
    wherein from 25 percent to 100 percent of all amine group hydrogens of said low molecular weight polyurethane have been replaced with methylol groups and
    wherein said aliphatic polyamine is selected from the group consisting of alkylamines, alkyleneamines, polyoxaalkanediamines, polyoxapolyazalkanamines, and polyoxapolyazalkanediamines, said aliphatic polyamine containing from two through four amine groups and wherein any oxyalkylene chain contains from one to five oxyalkylene groups and the maximum total oxyalkylene content is from two to about 20 units.

4. A methylolated polyurethane of claim 1 which is the reaction product of formaldehyde with a low molecular weight polyurethane having a reduced viscosity in water at 25° C. of from about 0.01 to about 0.06 and which is the reaction product of
    a polyol carbonate selected from the group consisting of sorbitol dicarbonate, sorbitol tricarbonate, erythritol dicarbonate, sorbitan dicarbonate, xylitol dicarbonate, melibiitol dicarbonate, melibiitol tricarbonate, melibiitol tetracarbonate, raffinitol dicarbonate, reaffinitol tricarbonate, raffinitol tetracarbonate, raffinitol pentacarbonate, and mixtures thereof, and
    an aliphatic polyamine is selected from the group consisting of hexamethylenediamine, dipropyleneglycoldiamine, trietyleneglycoldiamine, tetrabutyleneglycoldiamine, pentamethylenediamine, dipropylenetriamine, tetraethyltriamine, triethylenetetramine, putrescine, 1,2butane diamine, 4 chloro hexamethylenediamine, 4 hydroxy-1,8 diamino-octane, 1,2-butene diamine, 5 phenyl-1,2-diamino-pentane, bromophenyltriethyleneglycoldiamine, and $NH_2(C_3H_6—O)_3—C_3H_6—N—C_3H_6—O—C_3H_6NH_2$.

5. A process which comprises applying to textiles a textile assistant selected from the group consisting of a methylolated polyurethane of claim 1 and a methylolated polyol urethane with at least an average number of urethane groups equal to 2, said methylolated polyol urethanes being the reaction product of formaldehyde with the reaction product of ammonium hydroxide with a polyol carbonate of a polyol containing at least four hydroxyl groups and at least four carbon atoms and selected from the group consisting of hexitols, hexanetetrols, hexanepentols pentitols, pentanetetrols, tetritols, hexitans, and nonreducing polyhydric alcohols of di- and trisaccharides, said polyol carbonate having an average carbonate content of about two through about five carbonate groups per molecule.

6. A process for enhancing the properties of textile fabric which comprises applying to the textile fabric a methylolated polyurethane of claim 1 and subjecting the textile fabric to a temperature sufficient to cure the methylolated polyurethane.

7. A process for improving the properties of textile fabric which comprises applying to the textile fabric a methylolated polyurethane of claim 4 and subjecting the textile fabric to a temperature sufficient to cure the methylolated polyurethane.

8. As an article of manufacture, textile materials which have been treated in accordance with a process of claim 5.

9. As an article of manufacture, textile fabrics which have been treated in accordance with a process of claim 7.

10. A process according to claim 5 which comprises applying to a textile material an aqueous solution of the methylolated polyol urethane, drying the textile material, and curing said textile material.

11. As an article of manufacture, a textile material which has been treated in accordance with the process of claim 10.

* * * * *

UNITED STATES PATENT OFFICE
CERTIFICATE OF CORRECTION

Patent No. __3,624,016__  Dated __November 30, 1971__

Inventor(s) __Baak W. Lew__

It is certified that error appears in the above-identified patent and that said Letters Patent are hereby corrected as shown below:

Column 1, line 11, "u.S." should read -- U.S. --; line 12, after "2,935,494," and before "reaction" the word -- the -- should be inserted; lines 60 and 61, "pentamethylendiamine" should read -- pentamethylenediamine --. Column 2, line 18, "hexanepentils" should read -- hexanepentols --; line 65, "road" should read -- broad --. Column 3, line 3 the formula reading $$\text{"}\frac{\text{Viscosity of Solution=Viscosity of Solvent}}{\text{Concentration of Solution}} \quad (1) \text{"}$$

should read $$-- \frac{\frac{\text{Viscosity of Solution}}{\text{Viscosity of Solvent}} - 1}{\text{Concentration of Solution}} --;$$

line 45, after "and" and before "carbonate" insert -- a --; line 73, "65°-67C." should read -- 65°-67°C. --. Column 4, line 67, "67°-69C." should read -- 67°-69°C. --. Column 8, line 25, "reaffinitol" should read -- raffinitol --; line 50, after "molecule" and before the period insert -- and subjecting the textile fabric to a temperature sufficient to cure the methylolated polyurethane --.

Signed and sealed this 8th day of May 1973.

(SEAL)
Attest:

EDWARD M. FLETCHER, JR.
Attesting Officer

ROBERT GOTTSCHALK
Commissioner of Patents